G. P. UNVERZAGT.
Machine for Laminating the Stems in Leaf Tobacco.
No. 162,778. Patented May 4, 1875.
FIG I
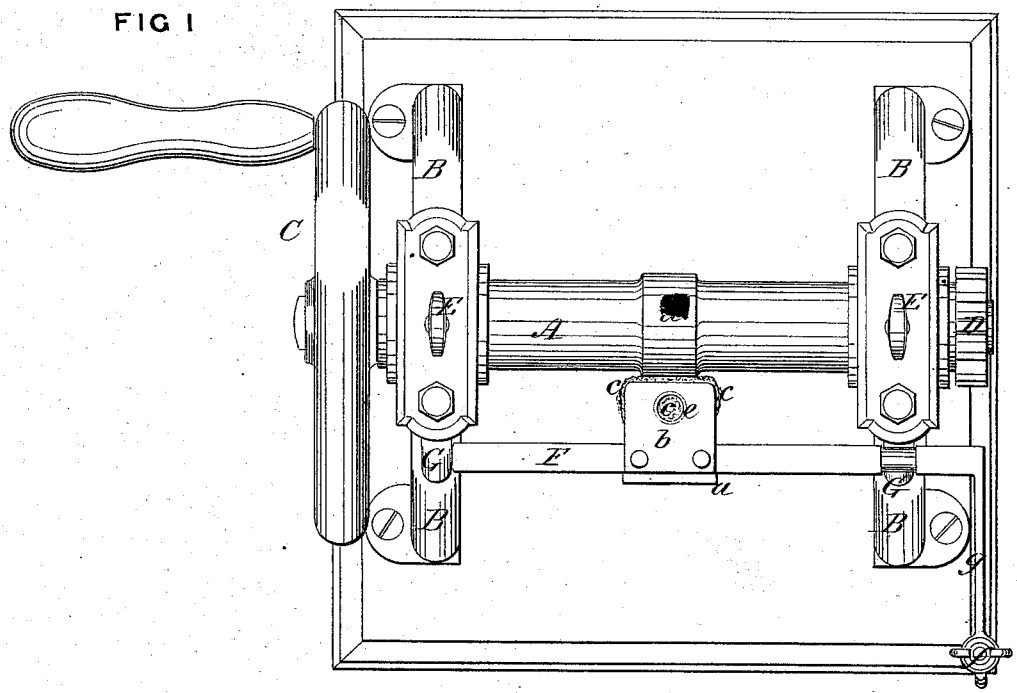
FIG II
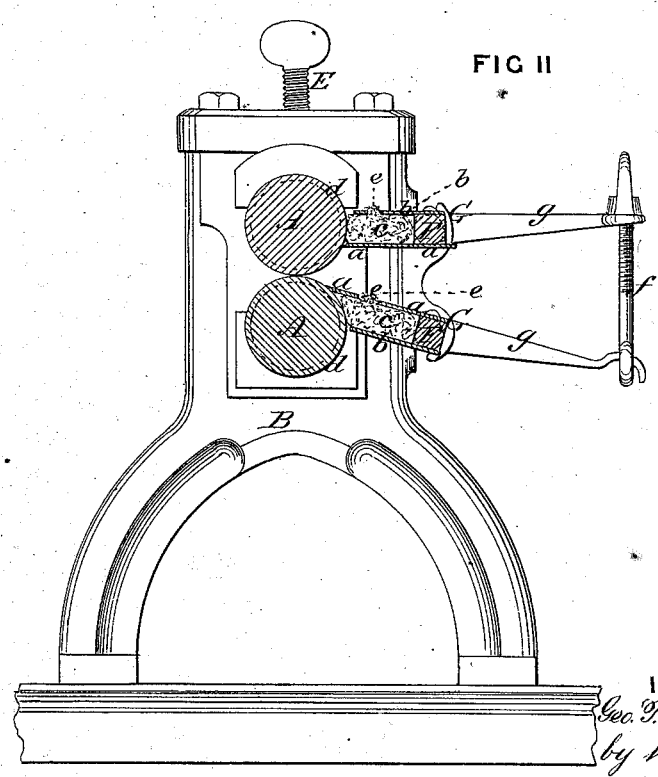
WITNESSES
John E. Laing
Frank A. Tormey
INVENTOR
Geo. P. Unverzagt,
by his Attorney
A. H. Slicer

UNITED STATES PATENT OFFICE.

GEORGE P. UNVERZAGT, OF BALTIMORE, MARYLAND.

IMPROVEMENT IN MACHINES FOR LAMINATING THE STEMS IN LEAF-TOBACCO.

Specification forming part of Letters Patent No. 162,778, dated May 4, 1875; application filed November 11, 1874.

*To all whom it may concern:*

Be it known that I, GEORGE P. UNVERZAGT, of Baltimore city, in the State of Maryland, have invented certain new and useful Improvements in Machines for Laminating Tobacco-Stems to the Leaf; and I do hereby declare that the following is a full, clear, and exact description thereof, reference being had to the accompanying drawings, in which—

Figure 1 represents a top view of a machine for laminating tobacco-stems, showing my invention, and Fig. 2 a vertical cross-section through the cleaning and scraping devices.

This invention is an improvement upon a machine patented to me November 3, 1874, for crushing tobacco-stems in the leaf. This machine, with others of its class, crushes the tobacco-stem or laminates it with the leaf by means of crushing-rolls mounted in standards, and provided with medial contact-collars, the stem of the leaf being laminated by said collars, and such gum as accumulates upon said collars being only partially removed by scrapers carried by adjustable horizontal bars, journaled in ears or projections of the standards. Since my invention relates especially to means for more effectually keeping the contact crushing collars or rolls of such machines free from gum, a further description of the machine itself is deemed unnecessary, in view of my said patent of November 3, 1874, wherein such a machine is fully set forth and described.

The machine preferred for use with my improvements consists of two crushing-rolls, A, having medial contact-collars, between which the leaf-stem is passed to be laminated, which rolls are mounted in standards B. The lower roll is driven by crank and drive wheel C upon one standard; and through intermatching-pinions D upon the other standard motion is also communicated to the other roll. The rolls are adjusted as to their distance apart by suitable devices E, and the cleaning and guiding parts are carried by adjustable horizontal bars F, journaled in ears G, or projections of the standards.

My said improvements on such machines consist in the combination, with the crushing-rolls, of sponge-holders formed by the scrapers and additional holding-plates, and the adjustable arms whereby the scrapers and moistening-sponge are made adjustable as one in relation to the rolls, thus preventing undue wear and tear of either, and preserving their concord of action against the rolls. Also, of a sponge-holder, consisting of plates, forming openings at their edges—the upper plates provided with perforations and situated upon suitable supports, whereby the sponges are held from lateral displacement, and to afford means for supplying them with water, as required.

The guides or scrapers $a$ converge toward the rolls A from adjacent sides of the horizontal adjustable bars F, which carry them. These plates $a$ serve not only as guides for the leaf and scrapers for the rolls, but, in combination with plates $b$ upon opposite sides of the bars F, act as holders for cleaning and moistening sponges $c$, which serve to keep the rolls constantly clean and lubricated. The holders $a\ b$ of each sponge $c$ approach each other as if pivoted upon the adjustable bars which carry them, when adjusted by means of arms $g\ g$ and the screw $f$; and the sponges, and the scrapers which assist in holding them, approach the rolls as one, and, their action being yielding, there is neither wear nor tear of either, but their action is in full accord against the rolls. By this arrangement also the sponges are kept continuously against the collars $d$ of the rolls, which would not be the case were the sponges held in unyielding pockets, as the sponges would quickly become so worn as to be out of useful reach of the rolls. These sponges $c$ are firmly seated in their respective holders formed by the guide-scrapers $a$ and plates $b$, as described, against the bars F, whereby a purchase is produced for each sponge in its rubbing against the collar. The plates $a$ and $b$ serve as clamps to hold the sponge, and in plate $b$ of the top sponge-holder and plate $a$ of the bottom one are one or more perforations, $e$, which act primarily as means for holding the sponges against any possible lateral displacement, since they press up into these openings and are held thereby, and also serve as a convenient means for wetting the sponge. The holders $a\ b$ are open at the sides, as shown in Fig. 1, to afford means for removing the sponges to cleanse them and replace them in the holders without requiring the removal of the holders. This is an important advantage, as the sponge often requires to be cleansed of the gum, and to be changed to present a fresh side to the action of the rolls. As the bars F serve as pivots for the sponge-holders, it will be seen that, in adjusting them by means of the arms $g\ g$ and the screw $f$, they close upon the rolls simultaneously and are held at such adjustment by the screw $f$, which connects the two arms $g\ g$, which are secured to the ends of the bars F F, as shown in Fig. 2.

I claim—

1. The combination, with the crushing rolls A A, of the sponge-holders, consisting of the scrapers $a\ a$, plates $b\ b$, and the adjustable arms $g\ g$, whereby the scrapers and moistening-sponges are made adjustable as one in relation to the rolls, in the manner substantially as herein set forth.

2. The sponge-holders, consisting of the plates $a\ b$, forming openings at their edges, the upper plates provided with perforations $e$, and situated upon suitable supports for the purpose, as hereinafter set forth.

In testimony that I claim the foregoing I have affixed my signature in presence of two witnesses.

GEORGE P. UNVERZAGT.

Witnesses:
 C. H. SLICER,
 GEORGE KERCKHOFF.